United States Patent [19]
Pruett

[11] Patent Number: 5,727,863
[45] Date of Patent: Mar. 17, 1998

[54] AIRCRAFT WING INSPECTION LIGHT SYSTEM

[75] Inventor: Henry Frazier Pruett, St. Paris, Ohio

[73] Assignee: Grimes Aerospace Company, Urbana, Ohio

[21] Appl. No.: 490,947

[22] Filed: Jun. 15, 1995

[51] Int. Cl.⁶ .................................................. B64D 47/02
[52] U.S. Cl. ........................................... 362/62; 362/265
[58] Field of Search ............................. 362/62, 63, 263, 362/264, 265

[56] References Cited

U.S. PATENT DOCUMENTS

| | | | |
|---|---|---|---|
| 3,411,131 | 11/1968 | Hewes | 362/62 X |
| 4,920,459 | 4/1990 | Rothwell, Jr. et al. | 362/263 X |
| 5,369,557 | 11/1994 | Ronney | 362/263 X |
| 5,434,763 | 7/1995 | Hege et al. | 362/265 |

Primary Examiner—Stephen F. Husar
Attorney, Agent, or Firm—Standley & Gilcrest

[57] ABSTRACT

An aircraft wing inspection light system used to illuminate an aircraft's wing to permit ice detection from inside the cabin. The aircraft wing inspection light system utilizes an arc lamp to provide enough light for the power available. In addition to the arc lamp, the aircraft wing inspection light system is further comprised of a housing, a lampholder, a lens, a reflector, a ballast which contains a power supply and a connecting means for connecting the lampholder to the ballast.

11 Claims, 4 Drawing Sheets

AIRCRAFT WING INSPECTION LIGHT SYSTEM

BACKGROUND & SUMMARY OF THE INVENTION

The invention, generally, relates to an aircraft wing inspection light system and, more particularly, to an aircraft wing inspection light system that utilizes arc lamp technology to illuminate an aircraft's wing to permit detection of ice from inside the cabin.

Ice formation on an aircraft's wing creates a dangerous condition for all those aboard the aircraft and those communities over which the aircraft is traveling. Ice on an aircraft's wing prohibits an aircraft from functioning properly. Many catastrophic and tragic aircraft crashes could be avoided if pilots could detect ice on their aircraft's wings from inside the cabin of the aircraft. The ability to detect ice on an aircraft's wing allows a pilot to take preventative or corrective actions to avert an otherwise unnecessary tragic result.

While other lamp technologies will also illuminate an aircraft's wing, available power limitations required the use of arc lamp technology to provide enough light for the power available. Thus, there is a need for an aircraft wing inspection light system that utilizes arc lamp technology.

This need is met by the aircraft wing inspection light system in accordance with the present invention wherein an arc lamp is used to illuminate the top surface of an aircraft's wing allowing for ice detection from inside the cabin.

In addition to an arc lamp, the present invention further comprises a housing for the lamp, a lampholder, a lens, a reflector, a ballast which contains a power supply and a connecting means for connecting the lampholder to the ballast.

DETAILED DESCRIPTION OF THE PREFERRED EMBODIMENT

Figure 1:
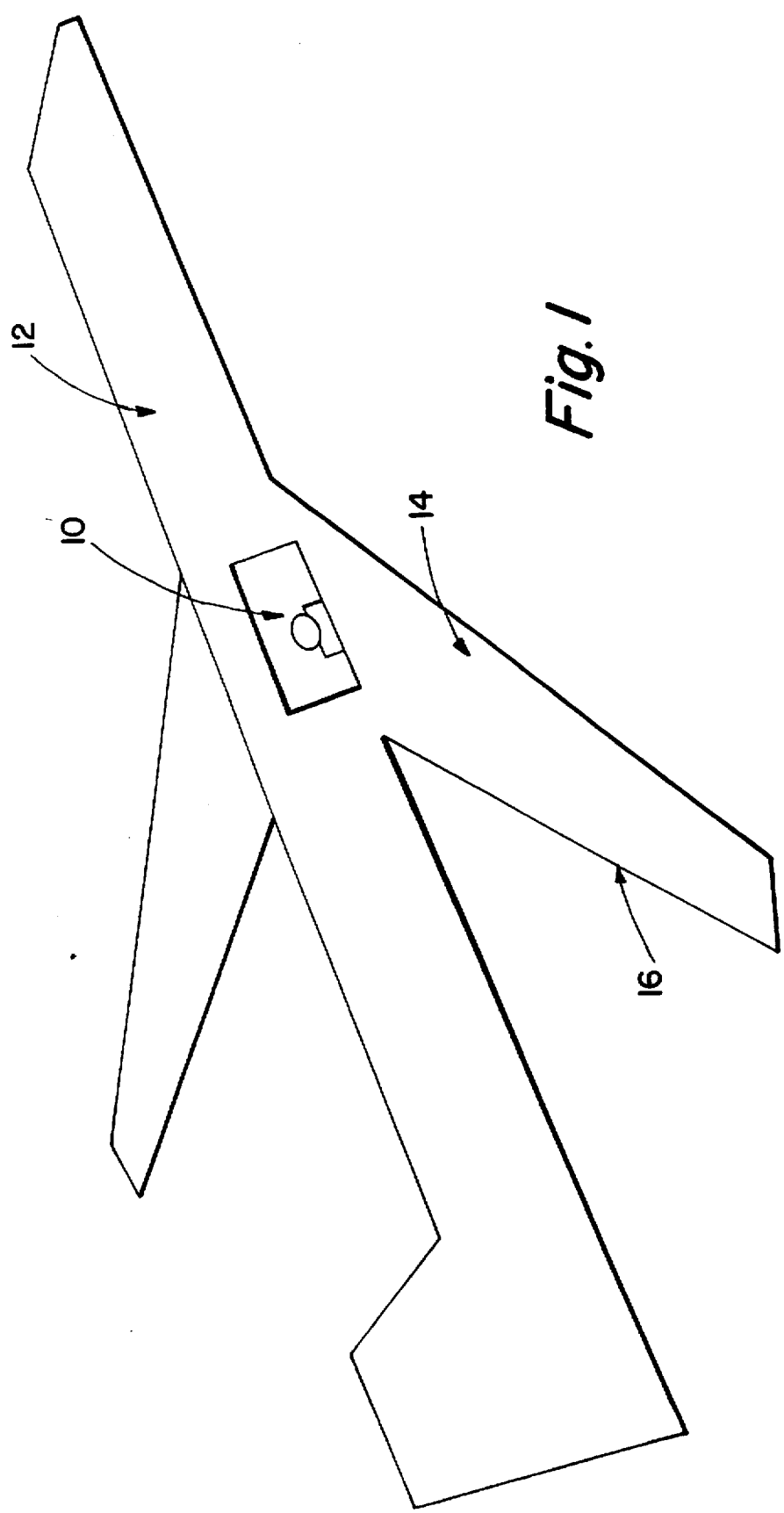
FIG. 1 is a side view of an aircraft showing the aircraft wing inspection light system mounted in the overwing emergency escape hatch, a preferred location for mounting.

Reference is now made to FIG. 1 which shows an aircraft wing inspection light system 10 in accordance with the present invention which is designed for use in an aircraft 12. The aircraft wing inspection light system 10 illuminates an aircraft's wing top surface 14 to permit ice detection on the wing 16. A preferred location for the mounting of the aircraft wing inspection light system 10 is in an aircraft's overwing emergency escape hatch.

Figure 2:
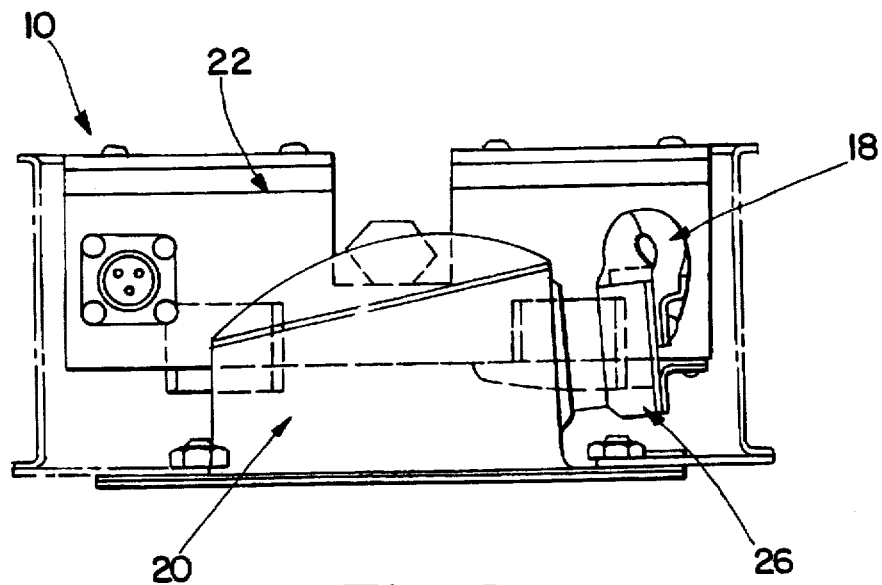
FIG. 2 is a top view of an aircraft wing inspection light system in accordance with the present invention.
Figure 3:
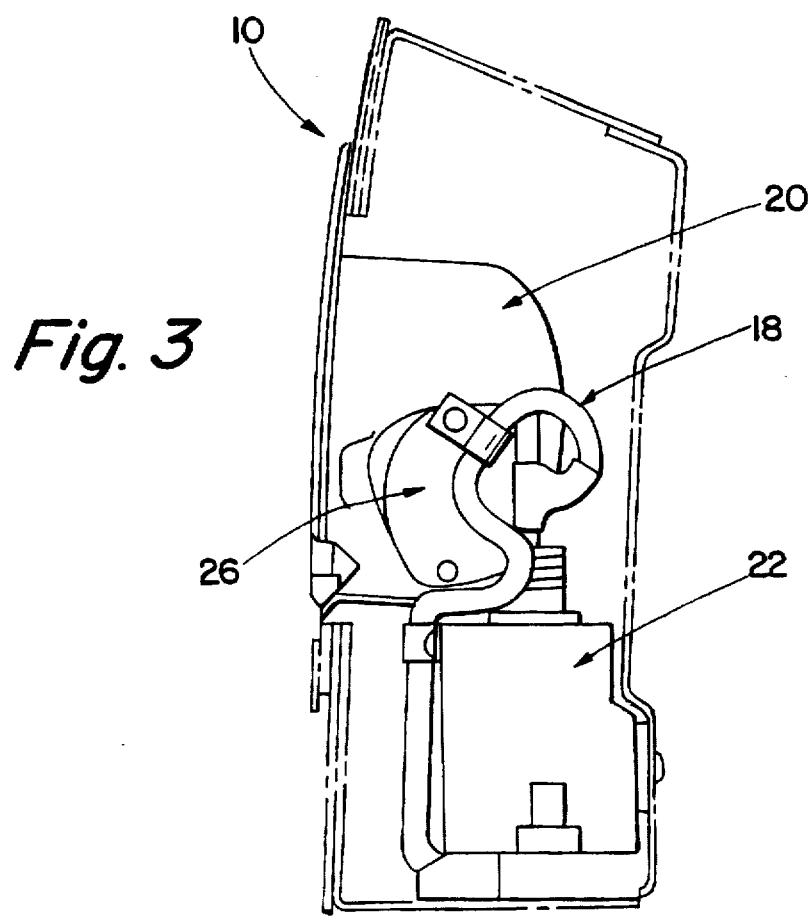
FIG. 3 is an AFT view looking forward of the aircraft wing inspection light system.
Figure 4:
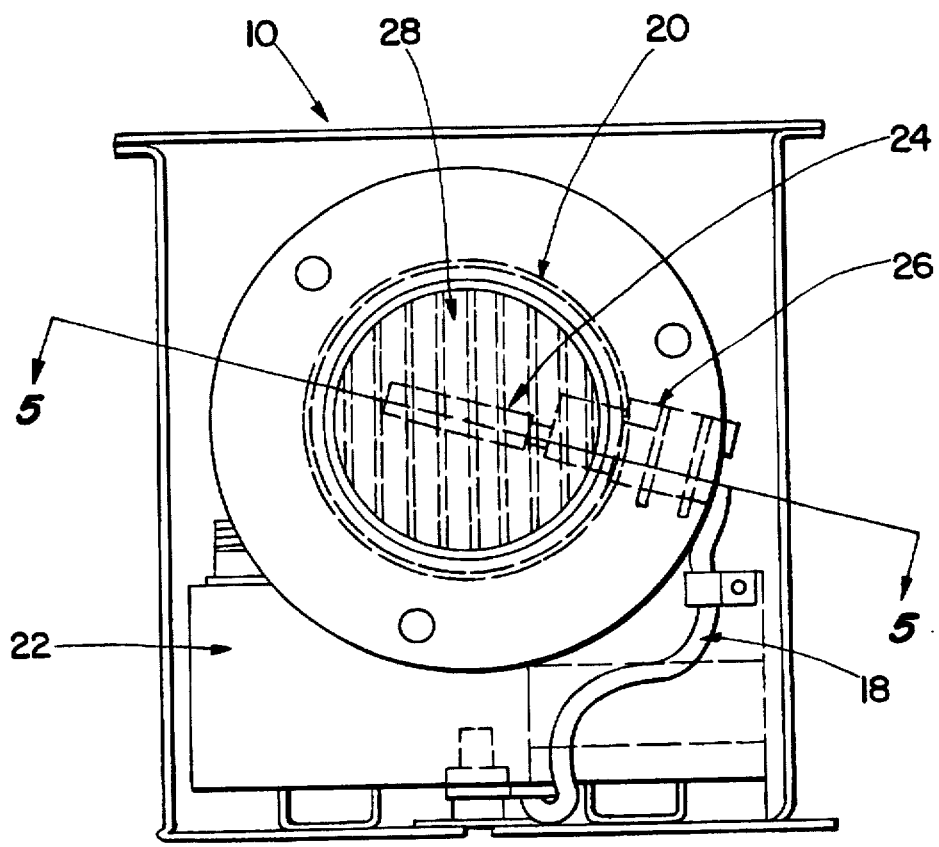
FIG. 4 is an outboard view of the aircraft wing inspection light system.

FIGS. 2, 3 and 4 show different views of the aircraft wing inspection light system 10 which is comprised of two major assemblies connected together by a connecting means. A preferred connecting means are lamp power wires 18. The two major assemblies are the housing 20 and the ballast 22. The ballast 22, which contains a power supply, includes an attachment means for attaching the aircraft wing inspection light system 10 to the aircraft 12 as represented in FIG. 1. FIGS. 2, 3 and 4 further show a lampholder 26 which is connected to the ballast 11 by lamp power wires 18. In addition, FIG. 4 shows an arc lamp 24 and a lens 28.

Figure 5:
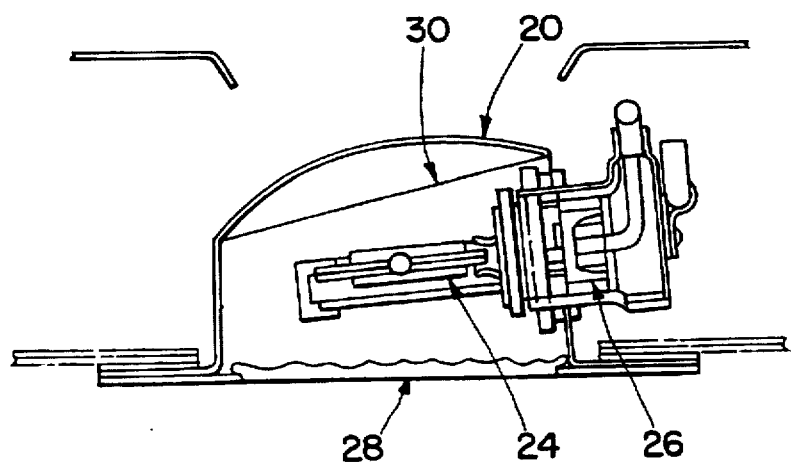
FIG. 5 is a cross-sectional view taken along A—A of FIG. 4 without the ballast.

Reference is now made to FIG. 5 which shows a cross-sectional view of the aircraft wing inspection light system 10 without the ballast 22. The housing 20 is adapted to house the arc lamp 24 and the lampholder 26. The housing 20 has a closed concave end and an open end. The lampholder 26 is adjoined to the housing 20 by an adjoining means. A preferred adjoining means is an adhesive. More particularly, a preferred adhesive is AD-330. The arc lamp 24 is adapted to reside in the lampholder 26.

Due to the available power limitations, an arc lamp 14 is used to produce enough light for the power available to illuminate the aircraft's wing top surface 14, as shown in FIG. 1, allowing for ice detection from inside the cabin. A preferred arc lamp 24 is a short arc lamp. More particularly, a preferred short arc lamp is a phillips D2S lamp.

The lens 28 is adapted to cover the open end of the housing 20. The lens is attached to the housing 20 by an attachment means. A preferred attachment means is a combination of a washer, a screw and a hex nut. A preferred lens composition is heat resistant glass. A preferred exterior surface of the lens 28, which is exposed to the weather, is zinc chromate primer.

The reflector 30 is adapted to reside in the closed concave end of the housing 20 such that the arc lamp 24 is positioned between the reflector 30 and the open end of the housing 20.

Figure 6:
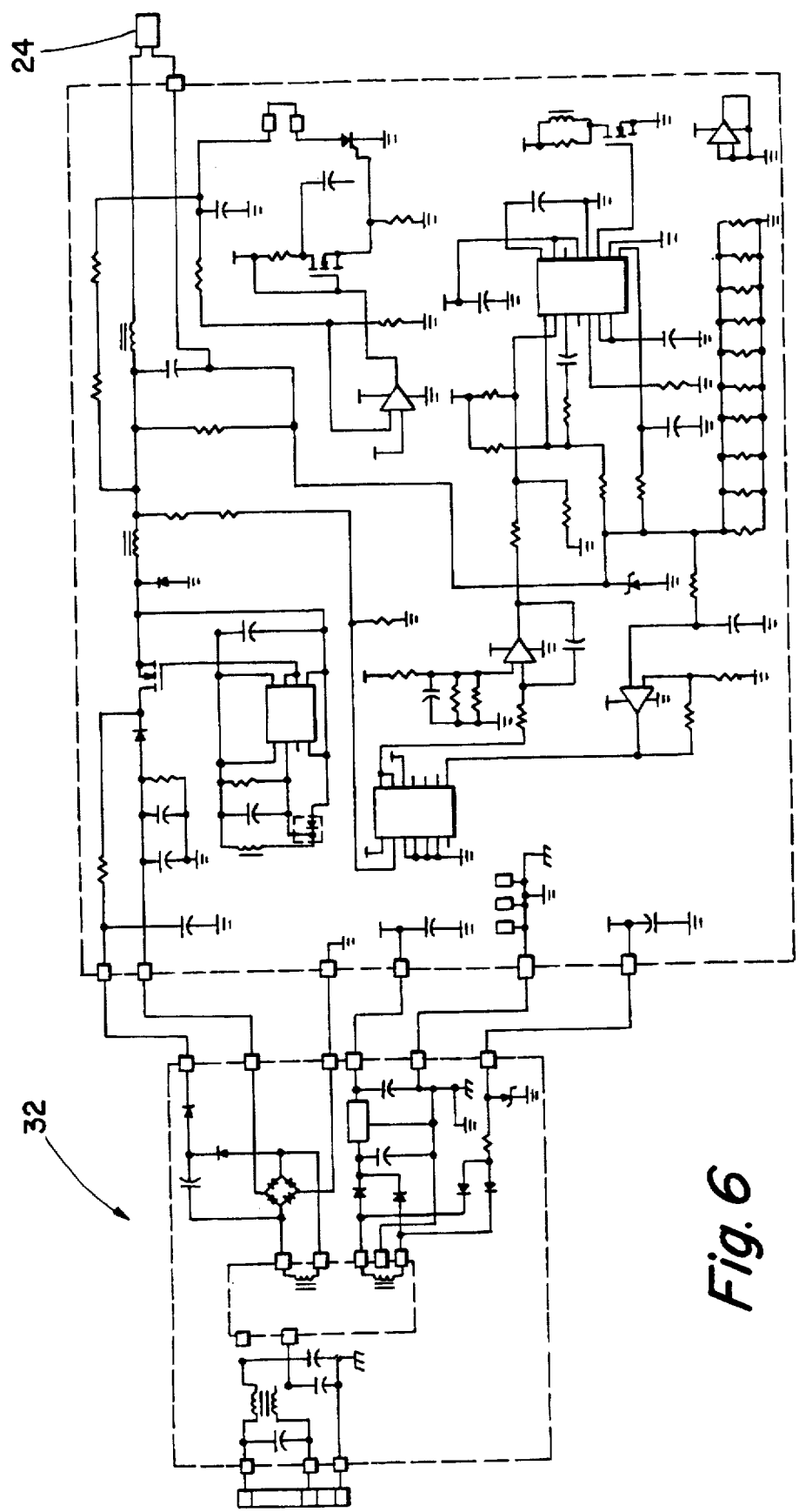
FIG. 6 is a schematic of a preferred power supply in accordance with the present invention.

FIG. 6 shows a schematic of a preferred power supply 32 in accordance with the present invention. The preferred power supply 32 is comprised of an EMI filter, an input power converter, a power converter, an ignition circuit and a control circuit. More particularly, the preferred power supply 32 utilizes a 26 VAC input power that passes through the EMI filter which controls conducted EMI. The EMI filter is a one section common mode low pass filter. The EMI filter is in series with the input power converter which is connected to the power converter. The ignition circuit is positioned in series between the power converter and the arc lamp 24. The control circuit is connected to the power converter and the arc lamp 24.

A preferred input power for the preferred power supply 32 is 26 VAC 400 Hz with a maximum available power of 45 watts. The 26 VAC is stepped up to a high voltage suitable for the arc lamp 24 by an input power converter comprising a step-up transformer, a full wave bridge rectifier, a ceramic filter capacitor and a charge pump circuit. The output of the step-up transformer is about 200 VAC. The step-up transformer output voltage is rectified by a full wave bridge rectifier and filtered by a ceramic filter capacitor. A charge pump circuit provides a higher voltage to be used by the trigger circuit and also provides a high open circuit voltage of about 500 VDC for reliable ignition of the arc lamp 24.

The rectified DC voltage from the input power converter is too high to be used by the arc lamp 24. While the arc lamp 24 requires about 15 KV to strike an arc in the arc lamp 24, once the arc in the arc lamp 24 has been established the lamp voltage is about 87 VDC. The rectified voltage is stepped down to the appropriate level by the power converter. The power converter is comprised of a buck converter which reduces the rectified voltage by switching it on and off to the output filter which filters the pulses. The buck converter is a single MOSFET switching element and freewheeling diode and the associated gate drive circuitry. The output filter is a double pole filter consisting of a single inductor and single capacitor. The filtered output is a DC voltage which is appropriate for the arc lamp 24.

The ignition circuit provides the high strike voltage for the arc lamp 24. The ignition circuit is comprised of a trigger transformer and a trigger capacitor. The trigger transformer is in series with the output filter to the arc lamp 24. The trigger circuitry is in the ballast 22 rather than part of the lighthead. The trigger is accomplished by discharging a capacitor through an SCR into the primary of the trigger transformer. The secondary of the trigger transformer is in series with the output filter and the arc lamp 24. The trigger voltage is 15 KV. The trigger circuit is a self quenching type. The trigger voltage comes from the input converter charge pump. Once the arc lamp 24 ignitions, the arc lamp 24 loads down the charge pump so the trigger capacitor does not recharge to the trigger level. This provides triggering to the arc lamp 24 until it strikes or restrike if it should extinguish during operation.

The control circuit provides timing and gate drive for the power converter and control for the lamp power. The control circuit is comprised of a faster inner feedback loop, a slower outer feedback loop, a power feedback loop, and a multiplier. The lamp voltage and current parameters vary by as much as 20%, however, the lamp power must be controlled to within 1% of the rated power which is 35 watts. The control scheme is a two feedback loop control. The faster inner feedback loop controls the lamp current using an average current mode technique. The slower outer feedback loop controls the power to the arc lamp 24. The power feedback loop gets power information from the multiplier. The multiplier output is the product of the lamp voltage and lamp current.

Having thus described the aircraft wing inspection light system of the present invention in detail and by reference to preferred embodiments thereof, it will be apparent that modifications and variations are possible without departing from the scope of the invention defined in the appended claims.

What is claimed is:

1. An apparatus for illuminating a wing of an aircraft, comprising:

a lampholder;

an arc lamp adapted to reside in said lampholder;

a housing adapted to house said lampholder and said arc lamp, said housing having a closed concave end and an open end;

a reflector adapted to reside in said closed concave end of said housing;

a lens adapted to cover said open end of said housing; and a ballast separate from said housing and connected to said lampholder by a connector, wherein said apparatus is mounted on said aircraft so that said wing can be illuminated.

2. An apparatus as claimed in claim 1 wherein said arc lamp is a short arc lamp.

3. An apparatus as claimed in claim 2 wherein said short arc lamp is a phillips D2S lamp.

4. An apparatus as claimed in claim 1 wherein said lens is painted with zinc chromate primer.

5. An apparatus as claimed in claim 1 wherein said housing is mounted in an aircraft's overwing emergency escape hatch.

6. An apparatus as claimed in claim 1 wherein said reflector is finished by clear anodize.

7. An apparatus as claimed in claim 1 wherein said ballast contains a power supply.

8. An apparatus as claimed in claim 7 wherein said power supply uses an input power of 26 VAC 400 Hz.

9. An apparatus as claimed in claim 7 wherein said power supply comprises:

an EMI filter in series with an input power converter;

a power converter connected to said input power converter;

an ignition circuit positioned in series between said power converter and said arc lamp; and a control circuit connected to said power converter and said arc lamp.

10. An apparatus as claimed in claim 1 wherein said connector is lamp power wires.

11. An apparatus for illuminating a wing of an aircraft, comprising:

a lampholder;

a short arc lamp adapted to reside in said lampholder;

a housing adapted to house said lampholder and said arc lamp, said housing having a closed concave end and an open end, said housing mounted in an aircraft's overwing emergency escape hatch so that said wing can be illuminated;

a reflector adapted to reside in said closed concave end of said housing;

a lens adapted to cover said open end of said housing; and a ballast separate from said housing and containing a power supply connected to said lampholder by lamp power wires.

* * * * *

UNITED STATES PATENT AND TRADEMARK OFFICE
CERTIFICATE OF CORRECTION

PATENT NO. : 5,727,863
DATED : March 17, 1998
INVENTOR(S) : Henry F. Pruett

It is certified that error appears in the above-indentified patent and that said Letters Patent is hereby corrected as shown below:

In column 2, line 6, please delete the number "11" and replace it with -- 22 --.

In column 2, line 17, please delete the number "14" and replace it with -- 24 --.

Signed and Sealed this

Twenty-first Day of July, 1998

Attest:

BRUCE LEHMAN

*Attesting Officer*  *Commissioner of Patents and Trademarks*